Aug. 23, 1932. M. ROMANO 1,873,907
WINDSHIELD CLEANER STRUCTURE
Filed April 24, 1931
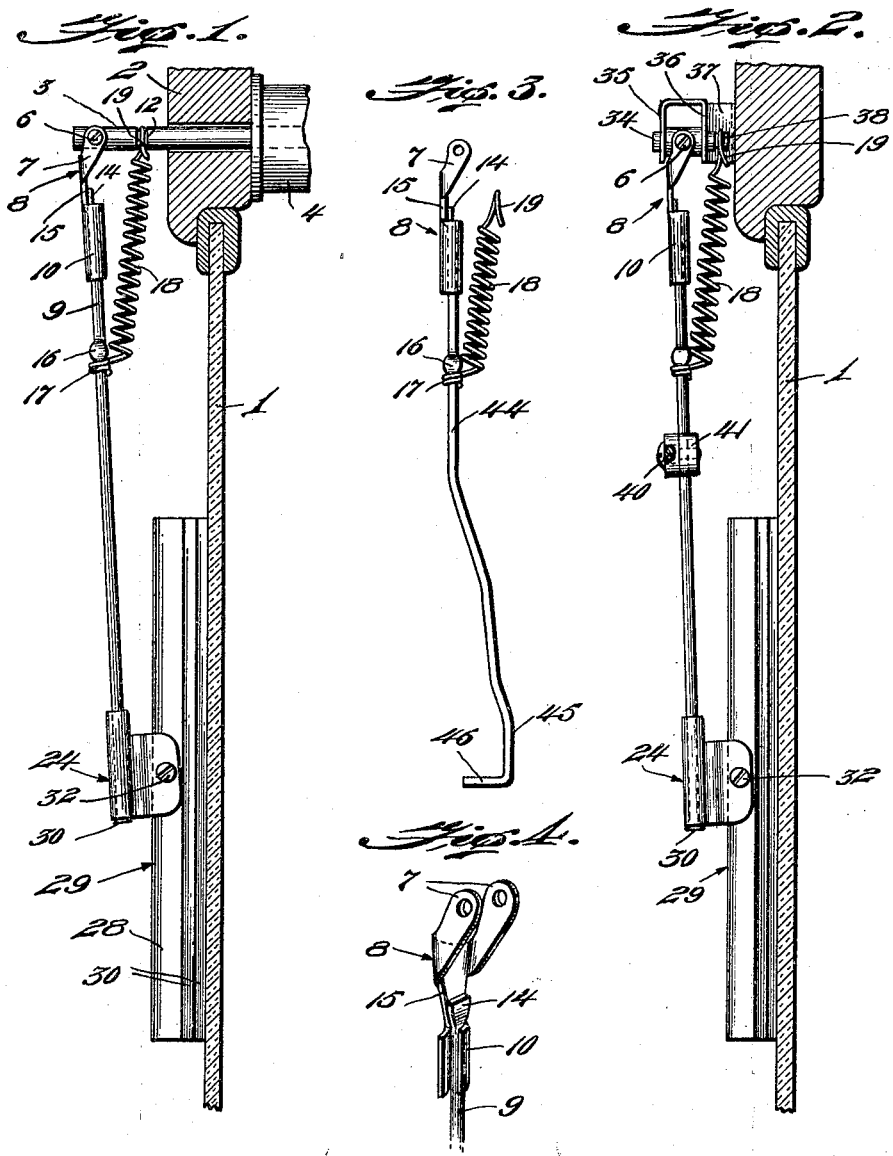

Patented Aug. 23, 1932

1,873,907

UNITED STATES PATENT OFFICE

MICHAEL ROMANO, OF PROVIDENCE, RHODE ISLAND

WINDSHIELD CLEANER STRUCTURE

Application filed April 24, 1931. Serial No. 532,476.

This invention relates to an improved windshield cleaner structure for operating the usual wiper blade from an oscillating shaft actuated either by suitable motor or by appropriate manually operated mechanism.

One object of the invention is to provide a device of this character which is capable of and adapted for attachment to a shaft in such a manner as to be easily and readily applied thereto or removed therefrom and capable of being placed under tension to force a wiper blade into resilient engagement with the surface of the windshield glass.

Another object of the invention is to provide a simple and efficient wiper structure wherein the arm is capable of being formed easily and cheaply, and in which the arm is positively held against accidental detachment from the operating shaft, the arm being so formed as to provide a firm and secure structure in which the parts are held against movement relative to each other and are firmly braced to prevent breakage.

A further object of the invention is the provision of an improved composite wiper arm comprising an intermediate rod portion and means for securing a connecting member and wiper blade supporting clip to opposite ends thereof in such a manner that they will be held against movement relative to the intermediate portion.

Other objects and advantages of the invention relate to various improved details of construction and novel arrangements of the parts as will be more fully set forth in the detailed description to follow.

Referring to the drawing:—

Fig. 1 is a vertical sectional view, taken through the windshield of an automobile, and showing the wiper blade and wiper arm in side elevation as applied to the shaft of a suitable operating motor, Fig. 2 is a view, similar to Fig. 1, showing the wiper arm as mounted upon a supporting shaft carried by a bracket attached to the windshield frame, such as may be employed in connection with one of the blades of a dual wiper structure, Fig. 3 is a side elevational view of a modified form of wiper arm, Fig. 4 is a detailed perspective view of that portion of the wiper arm which is adapted for attachment to an operating or supporting shaft, and, Fig. 5 is a disassembled perspective view showing the manner of connecting the free end of the wiper arm to a clip for attachment to a wiper blade.

In the embodiment of the invention illustrated herewith, 1 designates a windshield glass which is mounted in and supported by the usual frame 2. A shaft 3 is mounted for oscillatory movement in the frame 2 and may be actuated by a motor 4 of any desired construction, or by any suitable form of manual operating means such as is well known in the art.

The operating shaft 3 is provided with a transverse opening which may be located adjacent to the end thereof and which is adapted to receive a bolt or screw 6 passed through suitable openings formed in the spaced ears 7 of a connecting member 8, the ends of the bolt or screw 6 being held by or secured in the spaced ears 7 in such a manner as to be held against accidental removal. The connecting member 8 is secured to a rod 9, forming an intermediate portion of the wiper arm, by having a part 10 thereof bent closely around the rod. The shaft 3 may also be provided with an annular groove 12 located inwardly of or towards the plane of the windshield from the transverse opening formed in the shaft.

The intermediate rod portion 9 of the wiper arm may be of any desired cross-sectional shape, but in the present illustrated form of the invention it is shown as being round in cross-section and provided with a flattened end portion 14 adapted to project beyond the folded portion 10 of the connecting member 8 and to extend along and bear against the shank portion 15 of the connecting member to provide a support for the shank portion 15 and thus prevent the connecting member from being bent or broken at this point under the pressure exerted thereon by the tension spring.

The intermediate rod portion 9 of the wiper arm is also provided with a flattened portion 16 spaced from the flattened end 14 thereof a sufficient distance to serve as a stop for one or more coils 17 of a coiled tension spring 18. The coils 17 are bent around the rod 9 so as to slide thereon, but are engageable by the flattened portion 16 to limit the movement of the coils in the direction of the connecting member 8 whereby the coiled spring 18 may be placed under the necessary or desired tension when the hooked end 19 of the spring is engaged over the grooved portion 12 of the shaft 3.

That end of the intermediate rod portion 9 which is located opposite to the flattened end 14 is flattened, as at 22, for a sufficient distance to receive the looped portion 23 of a clip 24, the clip 24 being formed from a relatively thin metal plate, and the portion 23 thereof being bent closely around the flattened portion 22 of the arm 9 so as to hold the clip firmly against turning relative to the rod 9. Those portions of the clip 24 located adjacent to the bent portion 23 are forced inwardly, as indicated at 25, so that the clip will firmly engage the flattened portion of the rod with the inbent portions 25 of the clip in substantial engagement with each other. Those portions 26 of the clip which extend beyond the inbent portions 25 may be spaced from each other to provide a U-shaped recess 27 adapted to receive the channel-shaped metal back 28 of a wiper blade 29 which is provided with one or more flexible wiping strips 30 adapted to engage and wipe the windshield glass. The U-shaped recess 27 may be formed of sufficient width to permit the wiper blade 29 to tilt in opposite directions relative to the clip as it is moved back and forth across the windshield glass. The extreme end 30 of the intermediate portion 9 of the wiper arm located adjacent to the flattened portion 22 is unflattened or only slightly flattened to form what is in effect a slight enlargement extending a short distance beyond the clip 24 to prevent the clip from moving longitudinally of the rod 9 towards the end of the rod. This enlargement at the extreme end of the rod serves to provide shouldered portions on the rod at each end of the clip to hold the clip against longitudinal movement in either direction relative to the rod. A bolt or screw 32 is passed through the opposed spaced portions 26 of the clip and through a suitable opening formed in the metal back 28 of the wiper blade, and the opening in the metal back 28 is of sufficient size to provide a loose mounting, whereby the blade is supported in wiping position upon the wiper arm and enabled to tilt laterally in its movement across the glass.

In that form of the invention shown in Fig. 2 of the drawing, the wiper arm, wiper blade and their connected and associated parts are similar in all respects to those previously described except that the wiper arm is mounted upon an idler shaft 34 rotatably supported in spaced bearings 35 and 36 carried by a bracket 37, which bracket is secured to the outer face of the windshield frame 2. The shaft 34 is provided with a transverse opening for the reception of the bolt or screw 6 connecting the spaced ears 7 of the wiper arm and has an annular groove 38 formed therein adjacent to that end of the shaft which is located in proximity to the windshield frame for the reception of the hook 19 carried by the end of the coiled tension spring 18. The form of the invention shown in Fig. 2 of the drawing illustrates a type of idler shaft which may be employed in connection with the auxiliary wiper arm and blade of a dual wiper structure such as is frequently employed for wiping a portion of the windshield glass located at the right or left of that portion which is directly in front of the driver. The intermediate portion 9 of the auxiliary wiper arm may be actuated from the main wiper arm by any suitable means such as a connecting rod 40 pivotally connected to the auxiliary wiper arm by any suitable pivotal connection such as is indicated by the reference character 41.

As in that form of the structure shown in Fig. 1 of the drawing, the hook 19 of the coiled spring 18 engages the groove 38 of the shaft 34 to exert the necessary or desired degree of tension upon the auxiliary wiper arm and draw the wiper blade 29 inwardly towards the windshield glass so that it will bear firmly thereagainst as it is oscillated relative thereto either manually or by means of a suitable motor.

In each of the forms of the invention shown and described the manner of mounting the wiper arm upon the shaft is such as to permit the arm to be readily positioned thereon or removed therefrom, and to enable the arm to be moved outwardly from the plane of the windshield glass by disconnecting the hook 19 from the shaft and turning the arm about the bolt or screw 6 as a pivot. Such movement of the wiper arm outwardly from the plane of the windshield glass enables the user to remove the wiper blade 29 from the clip 24 and replace it with another at any time and without entirely disconnecting the wiper arm from its operating or supporting shaft. The bolt or screw 6 has its opposite ends secured in or connected to the oppositely positioned spaced ears 7 in such a manner as to positively secure the wiper arm against accidental separation from the operating or supporting shaft.

In that form of the invention shown in Fig. 3 of the drawing, the connecting member 8 and coiled spring 18 are the same in all respects as those previously described, and they are similarly connected to the wiper arm 44. The wiper arm 44 may be of any desired cross-sectional shape, but, as shown, is round in cross-section and is provided at the end opposite to the flattened portion 14 with an inwardly bent or downturned portion 45 terminating in an upturned end 46 of such shape as to enable it to be used with certain types of windshield wiper blades which are formed with spaced recesses in the back of the channel-shaped metal holder member capable of permitting the insertion of a bent rod of this character so as to support the wiper blade in such a manner as to permit it to tilt laterally as it moves back and forth across the windshield glass.

It will be seen that in the several forms of wiper arms illustrated herein, the parts are so constructed as to secure the arm to an operating or supporting shaft so as to positively retain it thereon and hold it against accidental removal, and to secure the arm to the shaft in such a manner as to permit the arm to be moved about the pivot bolt 6 either towards or from the windshield glass. The coiled spring 18 is located at an acute angle both to the wiper arm and to the operating or supporting shaft so that by its angular position connecting these parts it will exert a substantially uniform tension upon the wiper arm at all times and in all angular positions of the wiper arm to press the wiper blade against the glass uniformly regardless of the angular position of the operating or supporting shaft during the course of its oscillatory movement. The manner of connecting the clip to the intermediate rod portion of the wiper arm is such as to firmly retain the clip against turning movement or slippage longitudinally of the arm.

What I claim is:—

1. In a windshield cleaner structure, a supporting shaft provided with a transverse opening located adjacent to one end thereof and having an annular recess formed therein and spaced from the transverse opening, a wiper carrying arm provided with spaced ears, a pivot member passed through the spaced ears and located within the transverse opening formed in said shaft, and a coiled tension spring having one end thereof secured to said arm and the opposite end provided with a loop portion releasably engaging the groove formed in said shaft.

2. In a windshield cleaner structure the combination with a windshield glass, of a supporting shaft located at substantially right angles to said windshield glass and provided with a transverse opening extending therethrough, and a groove formed in said shaft and located intermediate said transverse opening and the plane of said windshield glass, a wiper arm provided with spaced oppositely positioned ears, a pivot member connecting said ears and extending through the transverse opening in said shaft, a wiper blade carried by said wiper arm, and a coiled tension spring having one end secured to said wiper arm and the opposite end having a hook releasably mounted in the groove carried by said shaft to draw the wiper blade into resilient engagement with said windshield glass.

3. In a windshield cleaner structure, a supporting shaft provided with an opening extending transversely thereof; a wiper arm comprising a rod member having one end thereof broadened and flattened; a connecting member comprising spaced ears adapted to receive a pivot member for connecting the rod member to the supporting shaft, a portion bent about the rod member below the broadened and flattened end thereof for connection therewith, and a shank portion connecting the spaced ears with said rod connecting portion, the broadened flattened end portion of said rod member bearing closely against the shank portion of said connecting member and serving as a support therefor when the parts are in assembled position; and a pivot member passed through the spaced ears of said connecting member and the transverse opening in said supporting shaft.

4. In a windshield cleaner structure, a wiper arm comprising an intermediate rod portion and a connecting member and metal clip secured to opposite ends of said rod portion for connecting said rod to a supporting shaft and wiper arm respectively, said connecting member being provided with spaced ears for receiving a pivot member whereby said wiper arm is pivotally connected to said shaft, and means carried by said rod member for reinforcing a portion of said connecting member.

5. In a windshield cleaner structure, a wiper arm comprising an intermediate member provided with flattened ends, a connecting member provided with spaced ears for receiving a pivot pin to connect said wiper arm with a supporting shaft, said connecting member having a portion bent about one end of the intermediate member adjacent to one of the flattened ends thereof in such a manner that the flattened end portion of the intermediate member will bear against and support a portion of said connecting member, and a clip having a portion bent closely about the flattened portion at the opposite end of said intermediate member to firmly secure the parts together and prevent the clip from turning relative to the intermediate member.

6. In a windshield cleaner structure, a wiper arm comprising an intermediate member provided with a flattened end, a clip for supporting a wiper blade having a portion bent closely about the flattened end of the intermediate member to hold the clip against turning relative thereto, a connecting member provided with spaced ears for receiving a pivot pin, a pivot pin carried by said ears, a supporting shaft provided with an opening for receiving that portion of the pivot pin located between the spaced ears, means carried by said connecting member for attachment to the intermediate member, and a coiled tension spring located at an angle to said intermediate member and connecting said intermediate member and said shaft to draw the end of the intermediate member which supports the wiper blade into close engagement with a windshield glass.

In testimony whereof I have affixed my signature.

MICHAEL ROMANO.